United States Patent
Jaranson et al.

(10) Patent No.: US 11,065,989 B2
(45) Date of Patent: Jul. 20, 2021

(54) SCISSOR LIFT ASSEMBLY

(71) Applicant: Ford Global Technologies, LLC, Dearborn, MI (US)

(72) Inventors: John Wayne Jaranson, Dearborn, MI (US); Marcos Silva Kondrad, Macomb Township, MI (US); Patrick Maloney, Livonia, MI (US); Christian J. Hosbach, Pittsburgh, PA (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 16/574,932

(22) Filed: Sep. 18, 2019

(65) Prior Publication Data
US 2021/0078456 A1   Mar. 18, 2021

(51) Int. Cl.
| | |
|---|---|
| *B60N 2/50* | (2006.01) |
| *B60N 2/16* | (2006.01) |
| *B60N 2/06* | (2006.01) |
| B60N 2/22 | (2006.01) |
| A61G 5/10 | (2006.01) |
| B60N 2/18 | (2006.01) |

(52) U.S. Cl.
CPC ........... *B60N 2/162* (2013.01); *B60N 2/06* (2013.01); *A61G 5/1059* (2013.01); *B60N 2/166* (2013.01); *B60N 2/1817* (2013.01); *B60N 2/22* (2013.01); *B60N 2/505* (2013.01); *B60N 2/508* (2013.01)

(58) Field of Classification Search
CPC ...... B60N 2/162; B60N 2/166; B60N 2/1817; B60N 2/508; B60N 2/505; A61G 5/1059
See application file for complete search history.

(56) References Cited

U.S. PATENT DOCUMENTS

| | | | |
|---|---|---|---|
| 4,371,207 A | 2/1983 | Wilking et al. | |
| 4,624,437 A * | 11/1986 | Sakamoto | B60N 2/502 |
| | | | 108/145 |
| 4,700,921 A * | 10/1987 | Holbrook | B63B 29/04 |
| | | | 248/188.6 |
| 4,941,641 A | 7/1990 | Granzow et al. | |
| 5,676,424 A | 10/1997 | Winkelhake | |
| 6,540,250 B1 | 4/2003 | Peterson | |
| 6,679,479 B1 * | 1/2004 | Watkins | B66F 7/065 |
| | | | 254/122 |

(Continued)

FOREIGN PATENT DOCUMENTS

EP          2223823 A1     9/2010

*Primary Examiner* — Syed A Islam
(74) *Attorney, Agent, or Firm* — David Coppiellie; Price Heneveld LLP

(57) ABSTRACT

A vehicle seat includes a seat base operably coupled with a seatback and having a seat pan. An upper connector is positioned on the seat pan. A lift assembly is operably coupled with the seat pan and includes a bracket defining a bracket slot. An outer link has a first end rotatably coupled with the seat pan and a second end that includes a lower connector. The lower connector is slidably received by the bracket slot. An inner link has a first end rotatably coupled with the bracket and a second end that defines a link slot. The link slot is configured to receive the upper connector. A sector gear is configured to facilitate vertical translation of the seat base.

20 Claims, 8 Drawing Sheets

(56) References Cited

U.S. PATENT DOCUMENTS

| | | | | |
|---|---|---|---|---|
| 7,712,836 B2* | 5/2010 | Deml | ................... | B60N 2/501 |
| | | | | 297/344.16 |
| 8,292,368 B1* | 10/2012 | Yarbrough | ............. | A47C 1/029 |
| | | | | 297/344.12 |
| 8,308,135 B2* | 11/2012 | Viste | ................... | B60N 2/501 |
| | | | | 254/93 VA |
| 8,439,334 B2* | 5/2013 | Deml | ................... | F16F 15/04 |
| | | | | 267/140.11 |
| 8,540,316 B2* | 9/2013 | Deml | ................... | B60N 2/502 |
| | | | | 297/344.15 |
| 8,622,362 B2* | 1/2014 | Keen | ................... | B60N 2/502 |
| | | | | 248/421 |
| 8,888,070 B2* | 11/2014 | Olesen | ................ | A61G 5/1059 |
| | | | | 254/9 C |
| 9,033,360 B2* | 5/2015 | Davis | .................. | A61G 5/1059 |
| | | | | 280/647 |
| 9,114,731 B2* | 8/2015 | Horiguchi | .............. | B60N 2/164 |
| 9,150,122 B2* | 10/2015 | Reichel | ................ | B60N 2/162 |
| 9,504,618 B2 | 11/2016 | Lykkegaard | | |
| 9,713,559 B2* | 7/2017 | Hough | ................ | A61G 5/1005 |
| 10,315,535 B2* | 6/2019 | Asai | ..................... | B60N 2/7011 |
| 10,336,218 B2* | 7/2019 | Nissen | .................... | B60N 2/38 |
| 10,457,172 B2* | 10/2019 | Titz | ....................... | B60N 2/0705 |
| 10,696,198 B2* | 6/2020 | Line | ........................ | B60N 2/36 |
| 2006/0087166 A1 | 4/2006 | Trippensee et al. | | |
| 2019/0381916 A1* | 12/2019 | Hill | ...................... | B60N 2/162 |
| 2020/0188202 A1* | 6/2020 | Chen | ...................... | A61G 5/14 |

\* cited by examiner

SCISSOR LIFT ASSEMBLY

FIELD OF THE DISCLOSURE

The present disclosure generally relates to a scissor lift assembly, and more specifically, to a scissor lift assembly for a vehicle seat.

BACKGROUND OF THE DISCLOSURE

Vehicle seating assemblies often need to be adjusted to accommodate various occupants and vehicle seat configurations. For example, the height of the vehicle seat may need to be vertically adjustable.

SUMMARY OF THE DISCLOSURE

According to one aspect of the present disclosure, a vehicle seat includes a seat base operably coupled with a seatback and has a seat pan. An upper connector is positioned on the seat pan. A lift assembly is operably coupled with the seat pan and includes a bracket defining a bracket slot. An outer link has a first end rotatably coupled with the seat pan and a second end that includes a lower connector. The lower connector is slidably received by the bracket slot. An inner link has a first end rotatably coupled with the bracket and a second end that defines a link slot. The link slot is configured to receive the upper connector. A sector gear is configured to facilitate vertical translation of the seat base.

Embodiments of this aspect and/or the other aspects of the disclosure can include any one or a combination of the following features:
- a seatback directly coupled with a bracket at a pivot;
- a vehicle seat that includes an actuator operably coupled with a sector gear and configured to engage with the sector gear to rotate the inner link to facilitate the vertical translation of a seat base;
- a seat pan that defines a recess configured to at least partially receive a lift assembly; and/or
- a cross-member fixedly coupled with a first end of an inner link.

According to another aspect of the present disclosure, a vehicle seat includes a seat pan with an upper connector. A lift assembly is operably coupled with the seat pan. The lift assembly includes a bracket that defines a bracket slot. An outer link is rotatably coupled with the seat pan. The outer link is slidably received by the bracket slot. An inner link is coupled by a cross-member. The inner link is rotatably coupled with the bracket and defines a link slot. The link slot is configured to receive the upper connector. A sector gear is coupled with the inner link and is configured to facilitate vertical translation of the seat pan.

Embodiments of this aspect and/or the other aspects of the disclosure can include any one or a combination of the following features:
- a vehicle seat that includes an actuator operably coupled with the sector gear, the actuator includes a pinion that has a plurality of pinion teeth, wherein the plurality of pinion teeth are gearingly engaged with a plurality of gear teeth of the sector gear;
- a vehicle seat that includes a track assembly that has first and second rail slides slidably coupled with first and second tracks, and a plurality of fasteners operably coupled to a bracket with one of the first and second rail slides;
- a vehicle seat that includes a track assembly that has first and second rail slides slidably coupled with first and second tracks, wherein a bracket is integrally formed with one of the first and second rail slides;
- a bracket slot and a link slot are generally obround; and/or
- an inner link is pivotally coupled with an outer link at a central pivot point.

According to another aspect of the present disclosure, a lift assembly for a vehicle seat includes a seat pan with an upper connector. A lift assembly is operably coupled with the seat pan. The lift assembly includes a bracket that defines a bracket slot. An outer link is rotatably coupled with the seat pan at a first end and is slidably received by the bracket slot at a second end. An inner link includes a first end rotatably coupled with the bracket and a second end that defines a link slot configured to receive the upper connector. A sector portion includes a sector gear coupled with the inner link and configured to rotate to facilitate vertical translation of the seat pan.

Embodiments of this aspect and/or the other aspects of the disclosure can include any one or a combination of the following features:
- a seat pan that includes an upper portion that extends from a lower portion, the upper portion is configured to form a plurality of sidewalls configured to support an occupant;
- a lower portion of a seat pan includes a front edge and a rear edge, the front edge and the rear edge are configured to at least partially define a recess, wherein the recess is configured to at least partially receive a lift assembly;
- a vehicle seat that includes an actuator operably coupled with a sector gear and is configured to rotate the sector gear to facilitate the vertical translation of a seat pan;
- an actuator that includes a pinion that has a plurality of pinion teeth, wherein the plurality of pinion teeth are gearingly engaged with a plurality of gear teeth of the sector gear;
- a vehicle seat that includes a low-friction rim insert positioned within one of a bracket slot and a link slot;
- a sector portion that defines a guide slot, the guide slot is configured to guide rotation of a sector gear;
- a vehicle seat that includes a track assembly that has first and second rail slides slidably coupled with first and second tracks; and/or
- a bracket directly coupled with a seatback of a vehicle seat.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE DISCLOSURE

Figure 1:
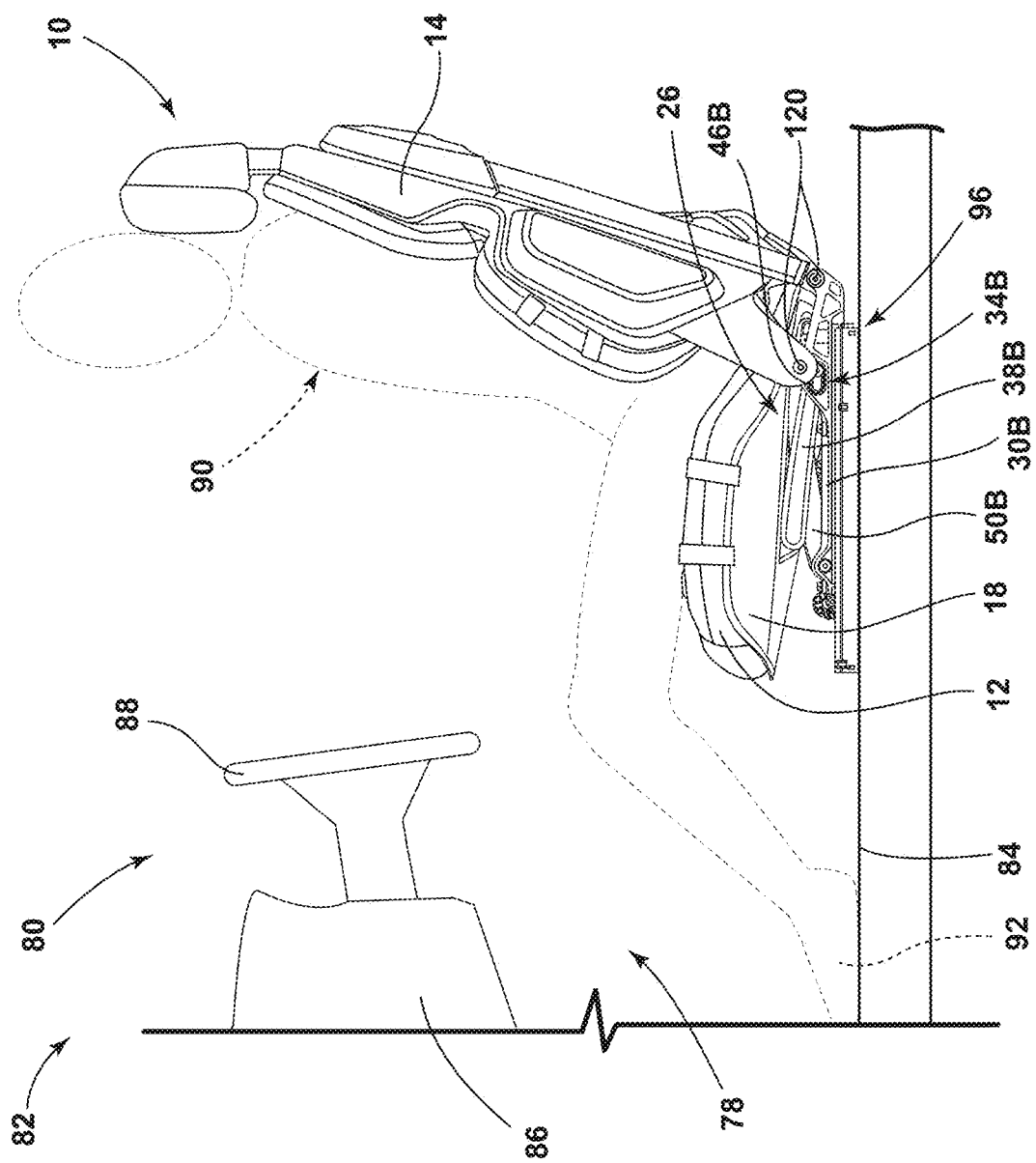
FIG. 1 is a side profile view of a vehicle seat with a scissor lift assembly in a first position, according to various examples.

The present illustrated embodiments reside primarily in combinations of method steps and apparatus components related to a scissor lift assembly for a vehicle seat. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-5B, reference numeral 10 generally designates a vehicle seat that includes a seat base 12 operably coupled with a seatback 14. The seat base 12 includes a seat pan 18 including inboard and outboard upper connectors 22A, 22B. A lift assembly 26 is operably coupled with the seat pan 18 and includes inboard and outboard brackets 30A, 30B. The inboard bracket 30A defines an inboard bracket slot 34A, and the outboard bracket 30B defines an outboard bracket slot 34B. The lift assembly 26 further includes inboard and outboard outer links 38A, 38B. The inboard outer link 38A has a first end 40A and a second end 42A, and the outboard outer link 38B has a first end 40B and a second end 42B. The first ends 40A, 40B of the inboard and outboard outer links 38A, 38B are coupled with the seat pan 18. The second end 42A of the inboard outer link 38A includes an inboard lower connector 46A, and the second end 42B of the outboard outer link 38B includes an outboard lower connector 46B. The inboard lower connector 46A is slidably received by the inboard bracket slot 34A, and the outboard lower connectors 46B is slidably received by the outboard bracket slot 34B. Consequently, the inboard and outboard outer links 38A, 38B are rotatably coupled with the seat pan 18 and slidably received by the inboard and outboard bracket slots 34A, 34B, respectively. The lift assembly 26 further includes inboard and outboard inner links 50A, 50B. The inboard inner link 50A includes a first end 52A and a second end 54A, and the outboard inner link 50B includes a first end 52B and a second end 54B. The first end 52A of the inboard inner link 50A is rotatably coupled with the inboard bracket 30A, and the second end 54A of the inboard inner link 50A defines an inboard link slot 58A configured to receive the inboard upper connector 22A. The first end 52B of the outboard inner link 50B is rotatably coupled with the outboard bracket 30B, and the second end 54B of the outboard inner link 50B defines an outboard link slot 58B configured to receive the outboard upper connector 22B. A sector gear 62 may be coupled with one of the inboard and outboard inner links 50A, 50B and is configured to facilitate vertical translation of the seat pan 18. An actuator 66 is operably coupled with the sector gear 62 and is configured to engage with the sector gear 62 to power vertical translation of the seat pan 18.

Referring still to FIGS. 1-5B, the vehicle seat 10 and the lift assembly 26 are illustrated having inboard and outboard sides. It will be understood that the inboard side of the lift assembly 26 has substantially the same construction as the outboard side of the lift assembly 26 and corresponding features are similarly numbered throughout.

Figure 2:
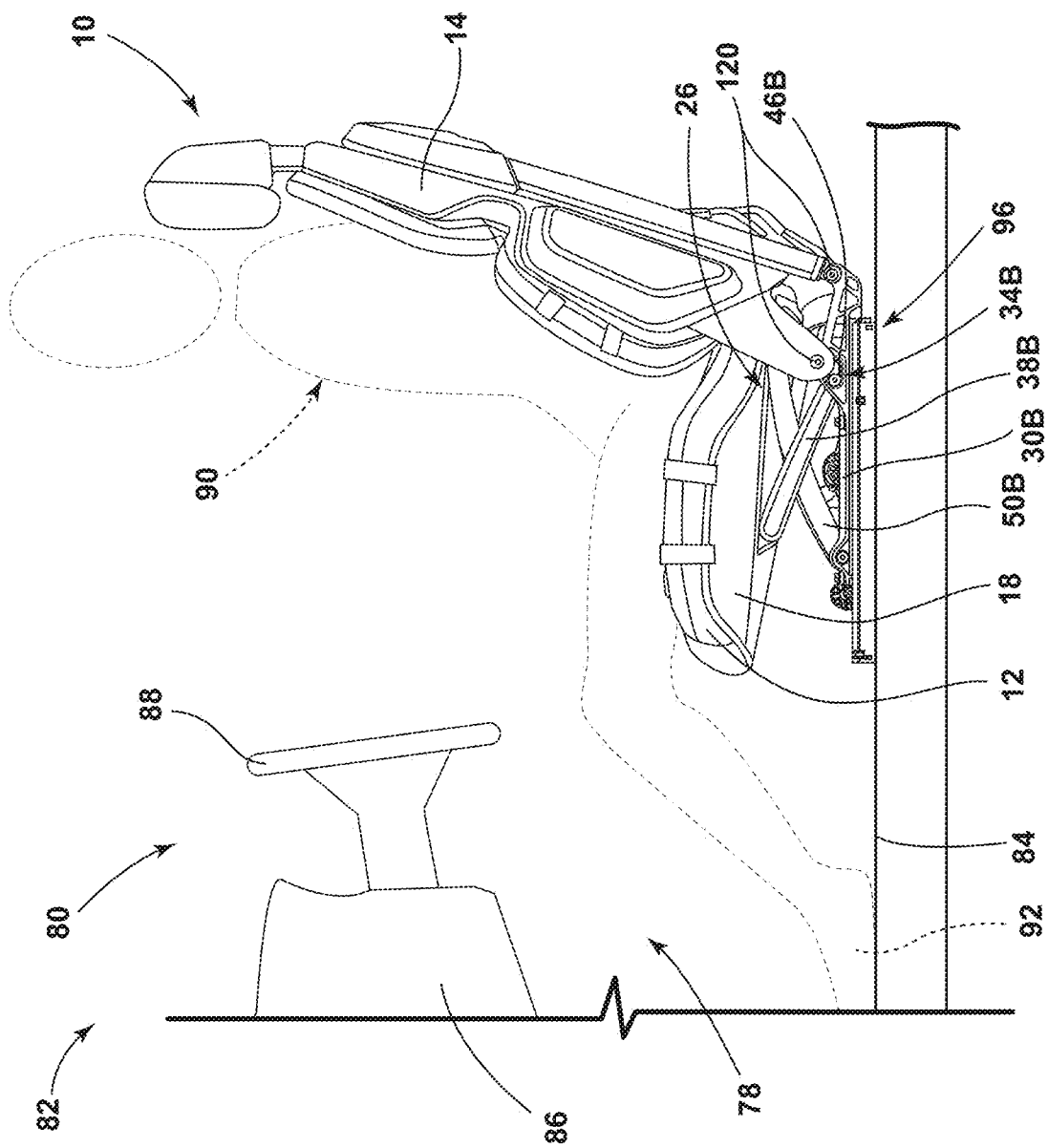
FIG. 2 is a side profile view of the vehicle seat of FIG. 1 with the scissor lift assembly in a second position.

Referring now to FIGS. 1 and 2, the vehicle seat 10 is illustrated from the outboard side disposed within a front portion 78 of an interior 80 of a vehicle 82. An instrument panel 86 extends transversely along the front portion 78 of the interior 80 of the vehicle 82. A steering wheel 88 extends from the instrument panel 86 and toward the vehicle seat 10 to be accessible by an occupant 90. When the occupant 90 is seated within the vehicle seat 10, the occupant 90 is positioned proximate the steering wheel 88 with feet 92 of the occupant 90 placed on or proximate a floor 84 of the vehicle 82.

The vehicle seat 10 includes the seat base 12 operably coupled with the seatback 14. In addition, the seatback 14 may be rotatably coupled with the seat base 12. The vehicle seat 10 further includes the seat pan 18 configured to provide a frame and/or support for a cushion of the seat base 12. In various examples, the lift assembly 26 may be positioned between the seat base 12 and the floor 84 of the vehicle 82. In other examples, the lift assembly 26 may be positioned between the seat base 12 and a track assembly 96. The lift assembly 26 is generally coupled with the seat pan 18 and is configured to couple the seat base 12 with the floor 84 of the vehicle 82 and/or the track assembly 96 of the vehicle 82. It is contemplated that the vehicle 82 may be any type of vehicle, such as a car, a truck, a van, etc. It is also contemplated that the concept set forth in this disclosure may be utilized in the front portion 78 of the vehicle 82, as well as, a rear portion of the vehicle 82, depending on the configuration of the vehicle 82.

The lift assembly 26 is configured to provide vertical translation or adjustment of the seat base 12 between lowered and raised positions, which correspond with the lowered and raised positions of the lift assembly 26 (FIGS. 1 and 2), respectively, as discussed in more detail elsewhere herein. In other words, the lift assembly 26 is configured to vertically translate the seat base 12 between the raised position and the lowered position. In various examples, the lift assembly 26 may be configured to provide the vertical translation to the seat pan 18 of the seat base 12. In other words, the lift assembly 26 is configured to vertically adjust the position of the seat base 12 and/or the seat pan 18 of the vehicle seat 10. However, the lift assembly 26 of the vehicle seat 10 is not configured to provide the vertical translation of the seatback 14 of the vehicle seat 10.

Referring to FIGS. 1-3B, the seat pan 18 may be configured to form a frame and/or support for a cushion of the seat base 12 of the vehicle seat 10 (FIGS. 1 and 2). The seat pan 18 includes an upper portion 100 and a lower portion 102. The upper portion 100 extends upward from, and is integrally formed with, the lower portion 102 of the seat pan 18; however, it is also contemplated that these could be separate pieces that are coupled together.

The upper portion 100 may be configured to provide support for the occupant 90 positioned within the vehicle seat 10, as illustrated in FIGS. 1 and 2. For example, the upper portion 100 may define inboard and outboard sidewalls 104A, 104B of the seat pan 18. Each of the inboard and outboard sidewalls 104A, 104B may be generally non-linear and may be shaped to provide support for the occupant 90. As illustrated in FIGS. 1-3B, the inboard and outboard sidewalls 104A, 104B may be continuous and extend along opposite sides of the seat pan 18. Alternatively, the inboard and outboard sidewalls 104A, 104B may be discontinuous and may include multiple portions positioned along the sides of the seat pan 18.

Figure 3A:
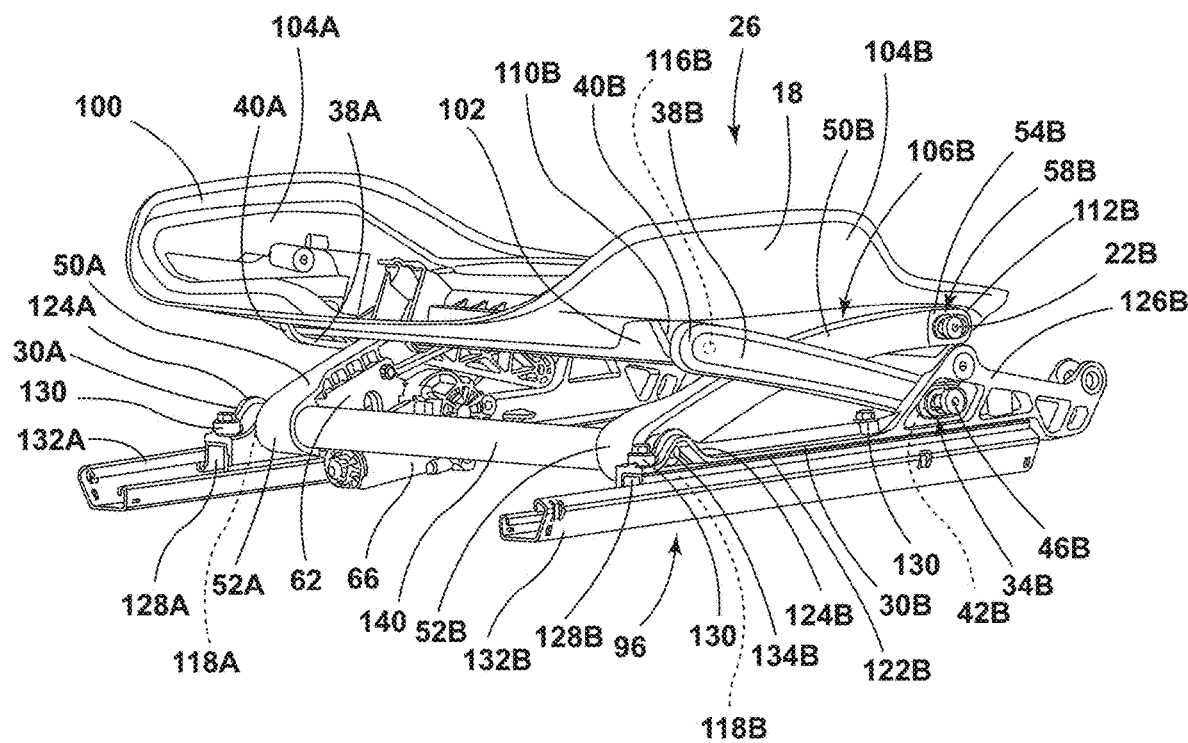
FIG. 3A is a side perspective view of a scissor lift assembly coupled with a track assembly with a sector gear on an inboard side of the scissor lift assembly, according to various examples.
Figure 3B:
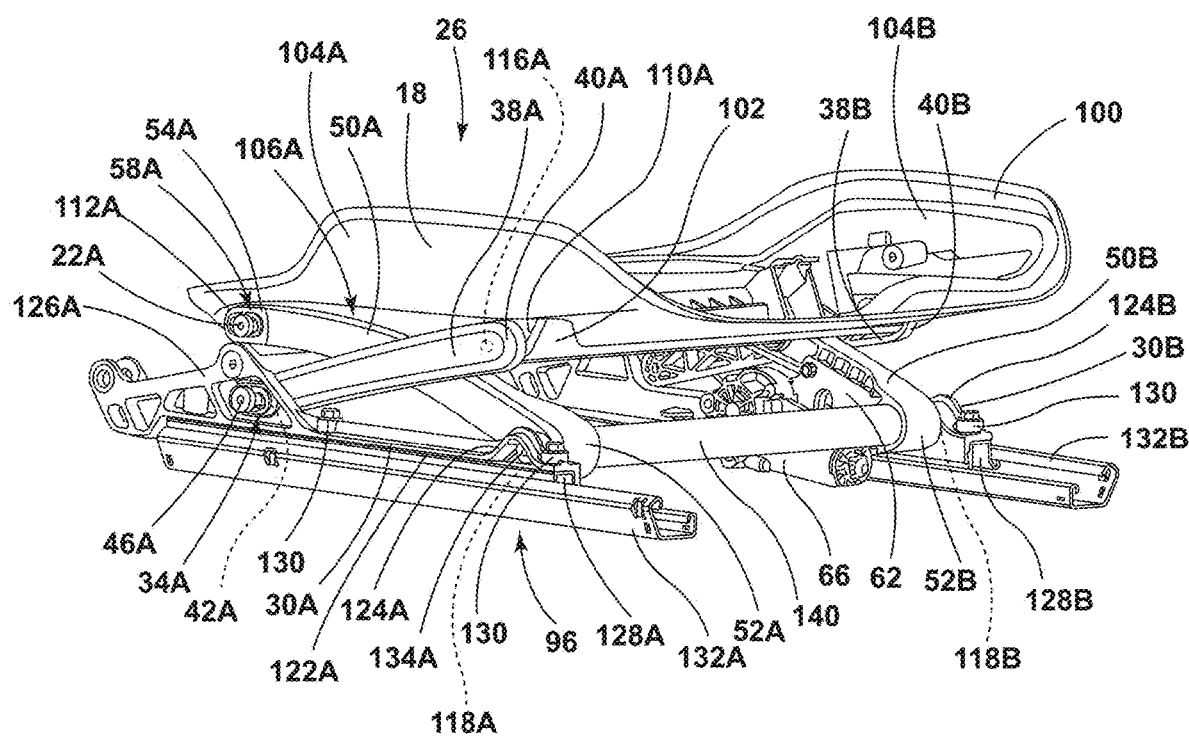
FIG. 3B is a side perspective view of a scissor lift assembly coupled with a track assembly with a sector gear on an outboard side of the scissor lift assembly, according to various examples.

The inboard and outboard sidewalls 104A, 104B and the lower portion 102 may define inboard and outboard recesses 106A, 106B, as illustrated in FIGS. 3A and 3B. The inboard recess 106A may be at least partially defined by a front edge 110A and a rear edge 112A of the lower portion 102 and the inboard sidewall 104A of the seat pan 18, and the outboard recess 106B may be at least partially defined by a front edge 110B and a rear edge 112B of the lower portion 102 and the outboard sidewall 104B of the seat pan 18. Each of the front edges 110A, 110B and the rear edges 112A, 112B may be generally vertical or may be positioned at an angle relative to the floor 84 of the vehicle 82. Each of the inboard and outboard recesses 106A, 106B may extend along at least part of the respective side of the seat pan 18 and may be configured to at least partially receive the lift assembly 26.

Figure 4A:
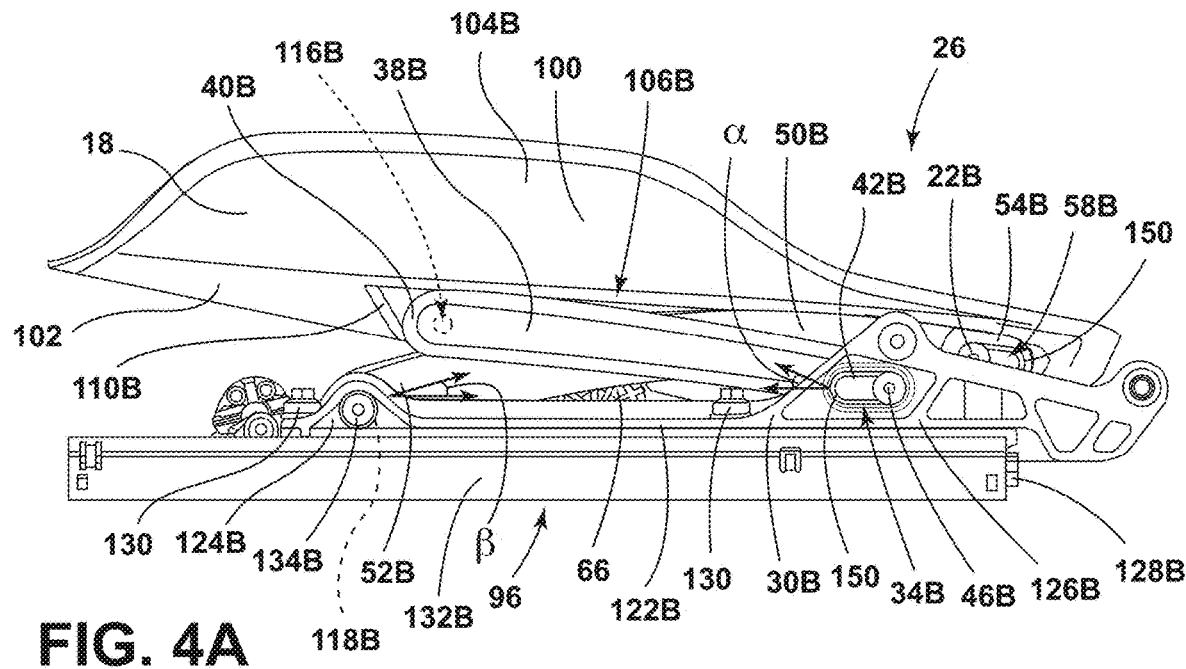
FIG. 4A is a side profile view of a scissor lift assembly coupled with a track assembly in a first position, according to various examples.
Figure 4B:
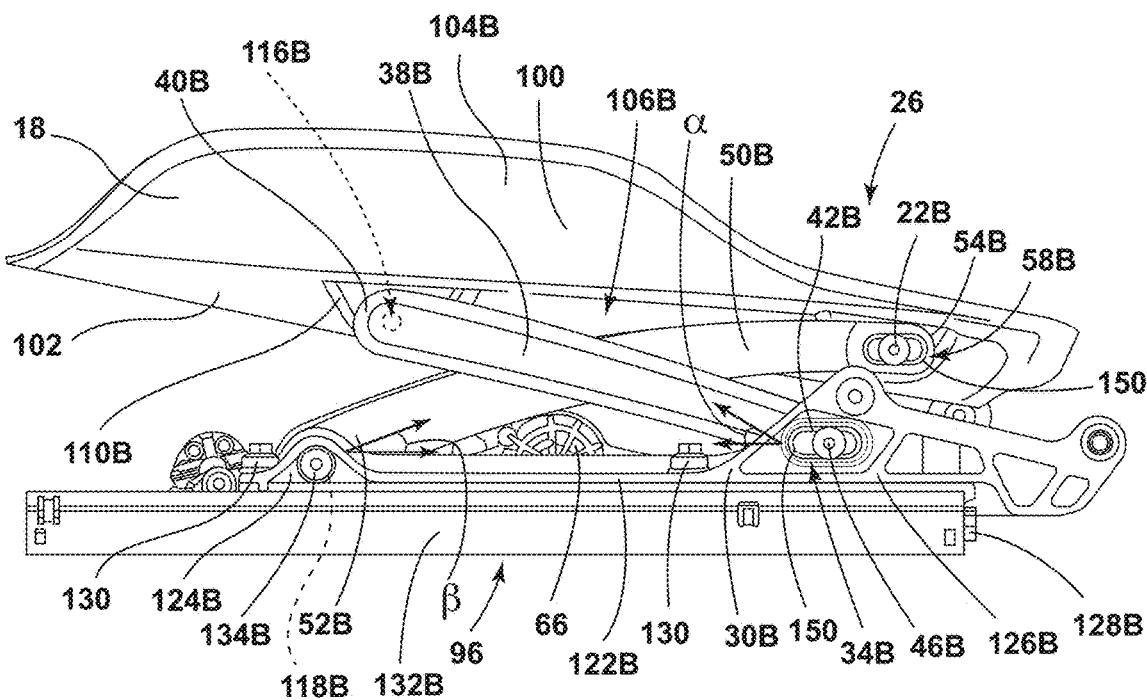
FIG. 4B is a side profile view of the scissor lift assembly of FIG. 4A coupled with the track assembly in an intermediate position.
Figure 4C:
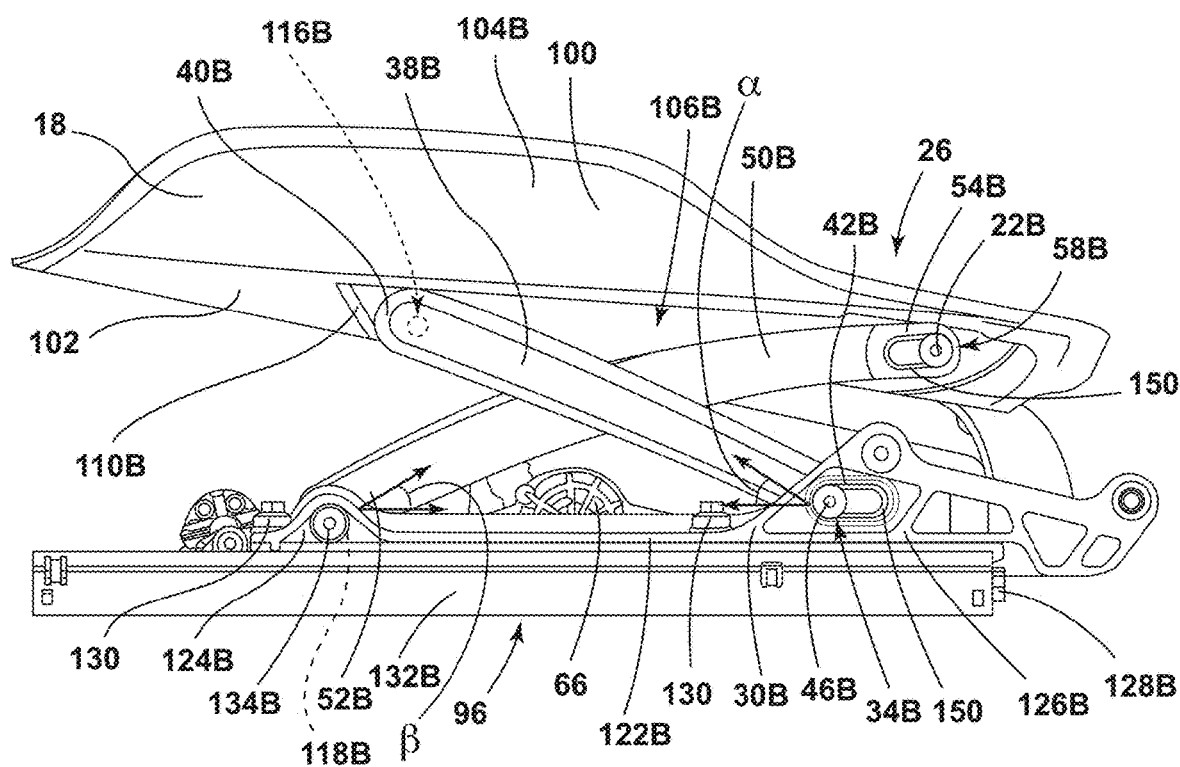
FIG. 4C is a side profile view of the scissor lift assembly of FIG. 4A coupled with the track assembly in a second position.

Referring now to FIGS. 4A-4C, a side profile view of the outboard side of the lift assembly 26 is illustrated. It will be understood that the corresponding features having similar numbers would be shown on the opposite side of the lift assembly 26. As shown in FIGS. 3A-4C, the seat pan 18 defines inboard and outboard pivot apertures 116A, 116B on opposing sides of the seat pan 18 for pivotally coupling the seat pan 18 to the lift assembly 26. The inboard and outboard pivot apertures 116A, 116B may be defined by the lower portion 102 of the seat pan 18. For example, the inboard pivot aperture 116A may be positioned proximate the front edge 110A of the inboard recess 106A, and the outboard pivot aperture 116B may be positioned proximate the front edge 110B of the outboard recess 106B. The inboard and outboard pivot apertures 116A, 116B are each configured to receive a fastener or pin to operably couple the lift assembly 26 with the seat pan 18.

Referring now to FIGS. 1-4C, the inboard and outboard upper connectors 22A, 22B are operably coupled with opposing sides of the seat pan 18, such that each of the inboard and outboard upper connectors 22A, 22B extend away of the seat pan 18. Each of the inboard and outboard upper connectors 22A, 22B may be operably coupled with the lower portion 102 of the seat pan 18. In various examples, the inboard and outboard upper connectors 22A, 22B may be coupled with the lower portion 102 of the seat pan 18, such that the inboard upper connector 22A is positioned proximate the rear edge 112A of the inboard recess 106A, and the outboard upper connector 22B is positioned proximate the rear edge 112B of the outboard recess 106B. In various examples, each of the inboard and outboard upper connectors 22A, 22B may be configured as a bushing extending from the respective side of the seat pan 18. Alternatively, the inboard upper connector 22A may be integrally formed with the lower portion 102 of the seat pan 18 proximate the rear edge 112A of the inboard recess 106A, and the outboard upper connector 22B may be integrally formed with the lower portion 102 of the seat pan 18 proximate the rear edge 112B of the outboard recess 106B.

Referring still to FIGS. 1-4C, the lift assembly 26 is a scissor lift assembly operable between the raised and lowered positions. The lift assembly 26 is operably coupled with the seat pan 18 for adjusting a vertical position of the seat base 12 relative to the floor 84 or track assembly 96 of the vehicle 82. For example, in FIG. 4A, the lift assembly 26 is in the lowered position with the seat pan 18 in a related lowered position. The lift assembly 26 is illustrated in an intermediate position in FIG. 4B and in the raised position in FIG. 4C, with the seat pan 18 in the related intermediate and raised positions, respectively. As illustrated, the lift assembly 26 is coupled with the seat pan 18 and includes the inboard and outboard brackets 30A, 30B, the inboard and outboard outer links 38A, 38B, and the inboard and outboard inner links 50A, 50B. In various examples, the lift assembly 26 may further include the sector gear 62 operably coupled with the actuator 66 for operating the lift assembly 26.

The lift assembly 26 includes the inboard and outboard brackets 30A, 30B positioned on opposing sides of the vehicle seat 10. The inboard and outboard brackets 30A, 30B may be mirrored. The inboard bracket 30A includes an elongated body 122A having a front end portion 124A and a rear end portion 126A, and the outboard bracket 30B includes an elongated body 122B having a front end portion 124B and a rear end portion 126B. The front end portion 124A of the inboard bracket 30A may extend upward from the body 122A and defines an inboard receiving well 118A configured to facilitate coupling the inboard inner link 50A with the inboard bracket 30A. Likewise, the front end portion 124B of the outboard bracket 30B may extend upward from the body 122B and defines an outboard receiving well 118B configured to facilitate coupling the outboard inner link 50B with the outboard bracket 30B.

The rear end portion 126A of the inboard bracket 30A also extends upward from the body 122A and may be larger than the front end portion 124A, and the rear end portion 126B of the outboard bracket 30B may also extend upward from the body 122B and may be larger than the front end portion 124B. In various examples, the rear end portions 126A, 126B may include one or more pivots 120 operably coupled with the seatback 14 of the vehicle seat 10. These pivots 120 allow the seatback 14 to be pivotable relative to the seat base 12 without being directly coupled with the seat base 12. Because the pivots 120 are positioned on the inboard and outboard brackets 30A, 30B, the seat base 12 may be vertically translated by the lift assembly 26 without affecting the positioning of the seatback 14.

The rear end portion 126A of the inboard bracket 30A defines the inboard bracket slot 34A, and the rear end portion 126B of the outboard bracket 30B defines the outboard bracket slot 34B. The inboard bracket slot 34A may be located forward of the pivots 120 of the inboard bracket 30A, and the outboard bracket slot 34B may be located forward of the pivots 120 of the outboard bracket 30B. Each of the inboard and outboard bracket slots 34A, 34B are elongated. For example, the inboard and outboard bracket slots 34A, 34B may each be defined as an obround, an ellipse, or any other elongated shape. The shape of each of the inboard and outboard bracket slots 34A, 34B are configured to facilitate horizontal sliding of the inboard and outboard lower connectors 46A, 46B along the inboard and outboard bracket slots 34A, 34B.

Referring still to FIGS. 1-4C, the inboard and outboard brackets 30A, 30B may be operably coupled with the track assembly 96 to couple the lift assembly 26 with the track assembly 96. The track assembly 96 may be operably coupled with the floor 84 of the vehicle 82 and may be configured to provide fore and/or aft translation of the vehicle seat 10 within the vehicle 82. The track assembly 96 includes inboard and outboard rail slides 128A, 128B. The inboard and outboard rail slides 128A, 128B are configured to be received by, and slidably coupled with the inboard and outboard tracks 132A, 132B of the track assembly 96. Movement of the inboard and outboard rail slides 128A, 128B along the inboard and outboard tracks 132A, 132B provides the fore and/or aft translation of the vehicle seat 10.

The inboard bracket 30A may be operably coupled with the inboard rail slide 128A, and the outboard bracket 30B may be operably coupled with the outboard rail slide 128B. For example, the inboard and outboard brackets 30A, 30B may be coupled with the inboard and outboard rail slides 128A, 128B using a plurality of fasteners 130, adhesive, welding, or any other coupling method, and/or a combination thereof. Alternatively, the inboard and outboard brackets 30A, 30B may be integrally formed with the inboard and outboard rail slides 128A, 128B. Where the inboard and outboard brackets 30A, 30B are integrally formed with the inboard and outboard rail slides 128A, 128B, the body 122A of the inboard bracket 30A may operate as the inboard rail slide 128A to slide along the inboard track 132A, and the body 122B of the outboard bracket 30B may operate as the outboard rail slide 128B to slide along the outboard track 132B.

Referring again to FIGS. 3A-4C, the lift assembly 26 further includes the inboard and outboard outer links 38A, 38B. The inboard and outboard outer links 38A, 38B are positioned on opposing sides of the seat pan 18, such that the inboard outer link 38A is positioned parallel to, and aligned with, the outboard outer link 38B to provide equal vertical translation on either side of the seat pan 18. The inboard outer link 38A may extend linearly between the first end 40A and the second end 42A, or may be generally curved, between the first end 40A and the second end 42A. Likewise, the outboard outer link 38B may extend linearly between the first end 40B and the second end 42B, or may be generally curved, between the first end 40B and the second end 42B.

The first end 40A of the inboard outer link 38A may be coupled with the lower portion 102 of the seat pan 18 proximate the front edge 110A of the inboard recess 106A, such that the first end 40A is at least partially positioned within the inboard recess 106A, and the first end 40B of the outboard outer link 38B may be coupled with the lower portion 102 of the seat pan 18 proximate the front edge 110B of the outboard recess 106B, such that the first end 40B is at least partially positioned within the outboard recess 106B. The first end 40A of the inboard outer link 38A is coupled with the seat pan 18 at the inboard pivot aperture 116A, and the first end 40B of the outboard outer link 38B is coupled with the seat pan 18 at the outboard pivot aperture 116B. A portion of the first end 40A may extend through the inboard pivot aperture 116A, or a pin may extend from the first end 40A and through the inboard pivot aperture 116A to couple the inboard outer link 38A with the seat pan 18. Likewise, a portion of the first end 40B may extend through the outboard pivot aperture 116B, or a pin may extend from the first end 40B and through the outboard pivot aperture 116B to couple the outboard outer link 38B with the seat pan 18.

The inboard lower connector 46A may be operably coupled with the second end 42A of the inboard outer link 38A or may be integrally formed with the second end 42A. The outboard lower connector 46B may be operably coupled with the second end 42B of the outboard outer link 38B, or may be integrally formed, with the second end 42B. In various examples, the inboard and outboard lower connectors 46A, 46B may be bushings extending outward from the second ends 42A, 42B of the inboard and outboard outer links 38A, 38B.

The inboard lower connector 46A is configured to be received by the inboard bracket slot 34A, and the outboard lower connector 46B is configured to be received by the outboard bracket slot 34B. In various examples, each of the inboard and outboard lower connectors 46A, 46B may include a low-friction sliding surface. In other examples, each of the inboard and outboard bracket slots 34A, 34B may include a low-friction sliding surface along an edge of the bracket slot 34A, 34B. For example, each of the inboard and outboard bracket slots 34A, 34B may be provided with a lubricant to facilitate the low-friction sliding surface or a low-friction material may be applied along the edges of each of the inboard and outboard bracket slots 34A, 34B. In still other examples, the low-friction rim inserts 150 may be positioned within the inboard and outboard bracket slots 34A, 34B to define low-friction sliding surfaces along the edges of the inboard and outboard bracket slots 34A, 34B. The low-friction sliding surfaces between the inboard and outboard lower connectors 46A, 46B and the inboard and outboard bracket slots 34A, 34B facilitate sliding of the inboard lower connector 46A along the length of the inboard bracket slot 34A, and sliding of the outboard lower connector 46B along the length of the outboard bracket slot 34B as the lift assembly 26 moves between the lowered position and the raised position.

Referring still to FIGS. 3A-4C, the lift assembly 26 further includes the inboard and outboard inner links 50A, 50B positioned on opposing sides of the seat pan 18. The inboard inner link 50A is positioned parallel to, and aligned with, the outboard inner link 50B to provide equal vertical translation on either side of the seat pan 18. The inboard inner link 50A may be pivotally coupled with the inboard outer link 38A at a centrally disposed pivot point, and the outboard inner link 50B may be pivotally coupled with the outboard outer link 38B at a centrally disposed pivot point.

The inboard inner link 50A may extend linearly between the first end 52A and the second end 54A, or may be generally curved, between the first end 52A and the second end 54A. Likewise, the outboard inner link 50B may extend linearly between the first end 52B and the second end 54B, or may be generally curved, between the first end 52B and the second end 54B. In various examples, each of the inboard and outboard inner links 50A, 50B may have substantially the same shape as each of the inboard and outboard outer links 38A, 38B. In other examples, each of the inboard and outboard inner links 50A, 50B may have a different shape than that of each of the inboard and outboard outer links 38A, 38B (e.g., each of the inboard and outboard inner links 50A, 50B may be linear while each of the inboard and outboard outer links 38A, 38B may be curved, and vice versa).

The first end 52A of the inboard inner link 50A is rotatably coupled with the inboard bracket 30A, and the first end 52B of the outboard inner link 50B is rotatably coupled with the outboard bracket 30B. The second ends 54A, 54B of the inboard and outboard inner links 50A, 50B are operably coupled with the seat pan 18. Specifically, the first end 52A of the inboard inner link 50A may be rotatably coupled with the front end portion 124A of the inboard bracket 30A by a pin 134A extending through the inboard receiving well 118A, and the first end 52B of the outboard inner link 50B may be rotatably coupled with the front end portion 124B of the outboard bracket 30B by a pin 134B extending through the outboard receiving well 118B. The pins 134A, 134B may be coupled with a cross-member 140 extending between the inboard and outboard inner links 50A, 50B. For example, the first end 52A of the inboard inner link 50A may be fixedly connected with the cross-member 140, such as by welding or adhesive, or may be coupled with the cross-member 140 using fasteners. The first end 52B of the outboard inner link 50B may be fixedly connected with the cross-member 140, such as by welding or adhesive, or may be coupled with the cross-member 140 using fasteners. The cross-member 140 may be configured to couple the inboard and outboard inner links 50A, 50B to ensure simultaneous movement of the inboard and outboard inner links 50A, 50B on each side of the seat pan 18.

The second end 54A of the inboard inner link 50A defines the inboard link slot 58A configured to receive the inboard upper connector 22A, and the second end 54B of the outboard inner link 50B defines the outboard link slot 58B configured to receive the outboard upper connector 22B. The inboard and outboard link slots 58A, 58B are elongated to facilitate horizontal sliding of the inboard and outboard upper connectors 22A, 22B along the inboard and outboard link slots 58A, 58B. For example, each of the inboard and outboard link slots 58A, 58B may be defined as an obround, an ellipse, or any other elongated shape. The inboard and outboard link slots 58A, 58B may be sized to correspond with the inboard and outboard bracket slots 34A, 34B so that the movement of the inboard and outboard upper connectors 22A, 22B along the inboard and outboard link slots 58A, 58B correspond with the movement of the inboard and outboard lower connectors 46A, 46B along the inboard and outboard bracket slots 34A, 34B.

The inboard and outboard upper connectors 22A, 22B of the seat pan 18 may be configured to be slidably received by the inboard and outboard link slots 58A, 58B. In various examples, each of the inboard and outboard upper connectors 22A, 22B may include a low-friction sliding surface. In other examples, the inboard and outboard link slots 58A, 58B may include low-friction sliding surfaces along edges of the inboard and outboard link slots 58A, 58B. For example, each of the inboard and outboard link slots 58A, 58B may be provided with a lubricant to facilitate the low-friction sliding surfaces or a low-friction material may be applied along the edges of the inboard and outboard link slots 58A, 58B. In still other examples, low-friction rim inserts 150 may be positioned within the inboard and outboard link slots 58A, 58B. The low-friction sliding surfaces between the inboard and outboard upper connectors 22A, 22B and the inboard and outboard link slots 58A, 58B facilitate sliding of the inboard and outboard upper connectors 22A, 22B along the inboard and outboard link slots 58A, 58B as the lift assembly 26 moves between the lowered position and the raised position. The movement of the inboard and outboard upper connectors 22A, 22B along the inboard and outboard link slots 58A, 58B may be simultaneous with the movement of the inboard and outboard lower connectors 46A, 46B along the inboard and outboard bracket slots 34A, 34B.

Referring now to FIGS. 4A-5B, the lift assembly 26 from the outboard side is illustrated in FIGS. 4A-4C and 5B. In FIG. 5A the lift assembly 26 is illustrated from the inboard side. One or both of the inboard and outboard inner links 50A, 50B may include a sector portion 154 defining the sector gear 62. The sector gear 62 is configured to engage the actuator 66 for driving the lift assembly 26 between the raised and lowered positions. In various examples, the sector portion 154 may be formed with the cross-member 140. In other examples, the sector portion 154 may be integrally formed with one of the inboard and outboard inner links 50A, 50B. The sector gear 62 includes a plurality of gear teeth 160 positioned along an edge of the sector portion 154. The plurality of gear teeth 160 is configured to engage the actuator 66. However, it will be contemplated that the sector gear 62 may be rotated using a manual assembly. For example, the sector gear 62 may be rotated using a pump clutch.

The sector portion 154 may also define a guide slot 156 proximate the sector gear 62. The guide slot 156 may be disposed rearwardly of the sector gear 62. It is contemplated that the guide slot 156 may also be positioned forward of the sector gear 62. In use, the guide slot 156 is configured to receive a guide member therethrough that is configured to guide rotational movement of the respective inner link of the inboard and outboard inner links 50A, 50B as the sector gear 62 is rotated by the actuator 66.

Figure 5A:
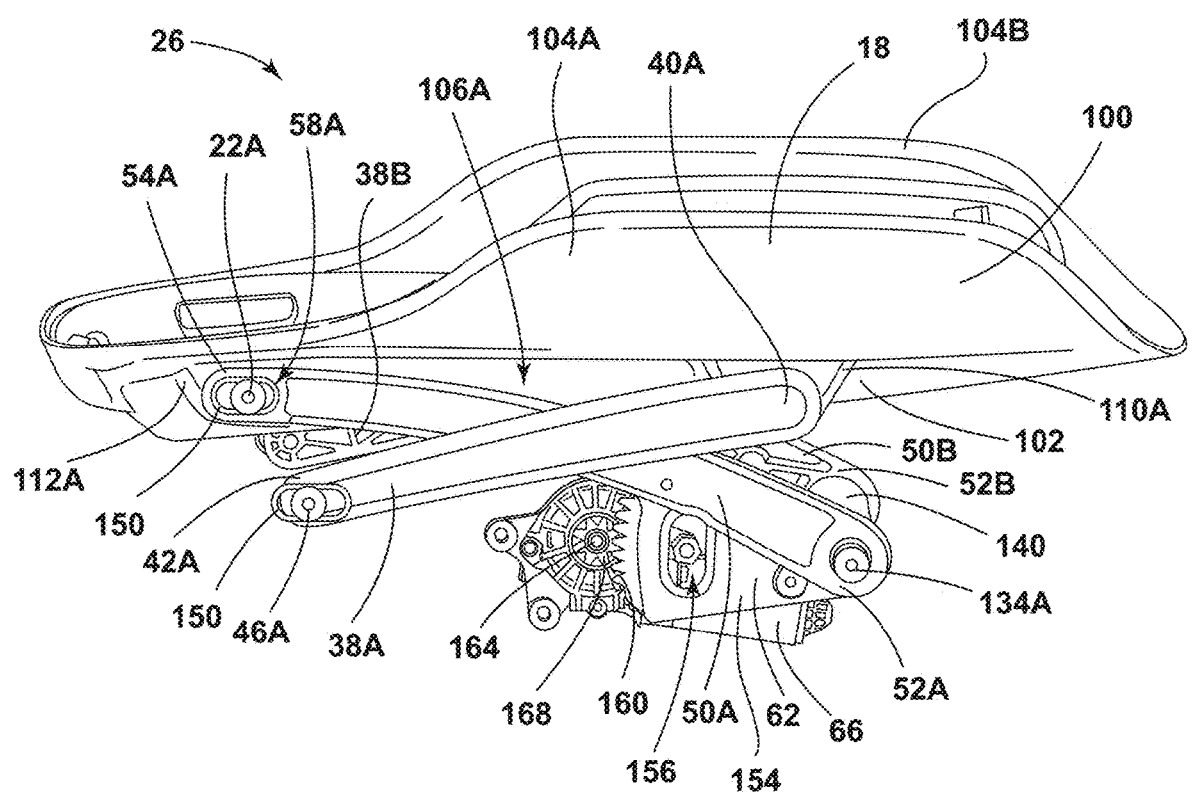
FIG. 5A is a side profile view of a scissor lift assembly with a sector gear on an inboard side of the scissor lift assembly, according to various examples.
Figure 5B:
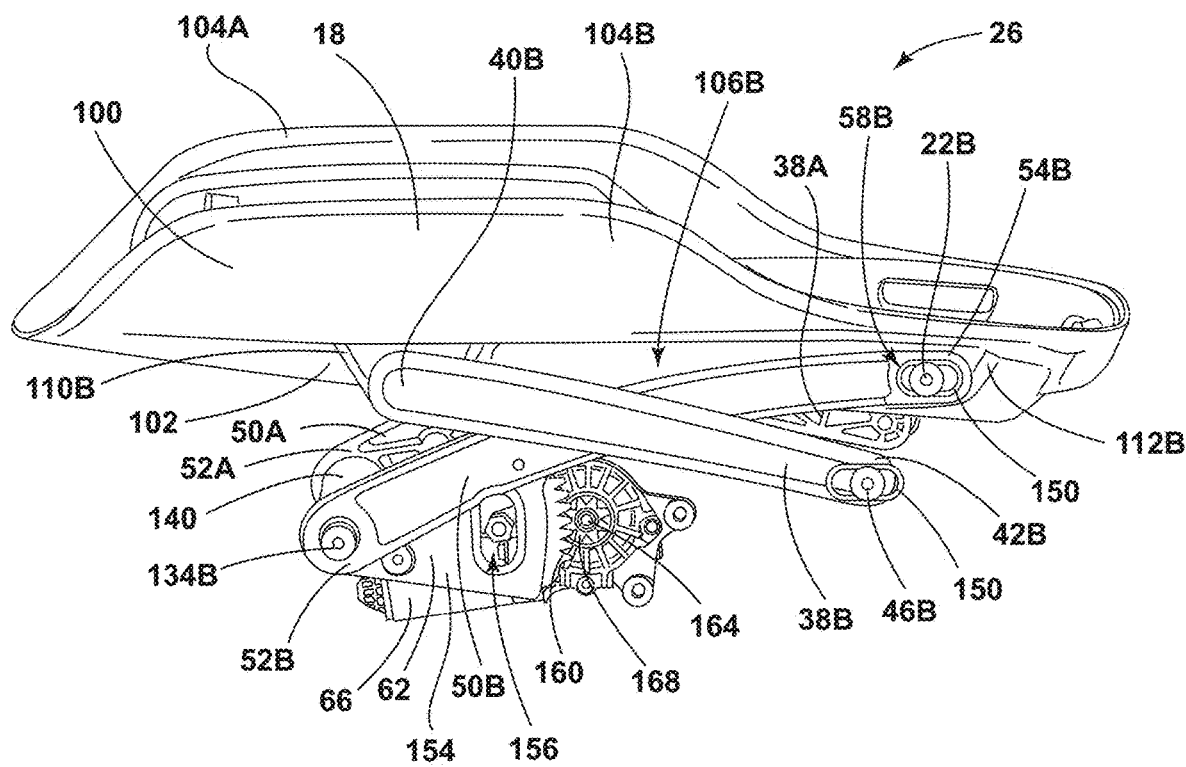
FIG. 5B is a side profile view of a scissor lift assembly with a sector gear on an outboard side of the scissor lift assembly, according to various examples.

Referring now to FIGS. 5A and 5B, as illustrated, the actuator 66 is engaged with the lift assembly 26. The actuator 66 may include a pinion 164 extending outward of the actuator 66 and configured to be rotated by the actuator 66. In various examples, the pinion 164 may be configured as a pinion gear including a plurality of pinion teeth 168. In FIGS. 5A and 5B, the pinion 164 is illustrated with the plurality of pinion teeth 168 gearingly engaged with the plurality of gear teeth 160 of the sector gear 62. The rotation of the pinion 164 is opposite the rotation of the sector gear 62. As the actuator 66 drives the rotation of the pinion 164, the engagement between the plurality of pinion teeth 168 and the plurality of gear teeth 160 rotates the inboard and outboard inner links 50A, 50B to raise and/or lower the seat pan 18 as supported on the lift assembly 26. It will be understood that the actuator 66 may be a motor or any other mechanism configured to provide rotation of the pinion 164.

Referring now to FIGS. 1-5B, the lift assembly 26 is configured to move between the lowered position and the raised position and may be positioned at a plurality of intermediate positions therebetween to provide corresponding positions of the seat base 12 of the vehicle seat 10. When the lift assembly 26 is in the lowered position, as illustrated in FIG. 4A, the inboard and outboard upper connectors 22A, 22B are at forward ends of the inboard and outboard link slots 58A, 58B, and the inboard and outboard lower connectors 46A, 46B are at rearward ends of the inboard and outboard bracket slots 34A, 34B. The inboard outer link 38A and the inboard inner link 50A may be at least partially received by the inboard recess 106A of the seat pan 18, and the outboard outer link 38B and the outboard inner link 50B may be at least partially received by the outboard recess 106B of the seat pan 18. An upper end of the sector gear 62 is positioned proximate the pinion 164 such that the plurality of pinion teeth 168 are engaged with an end of the plurality of gear teeth 160.

As the lift assembly 26 moves to the raised position, the pinion 164 rotates in a first direction to rotate the sector gear 62 to rotate the inboard and outboard inner links 50A, 50B. The inboard and outboard upper connectors 22A, 22B slide along the inboard and outboard link slots 58A, 58B toward the rearward ends of the inboard and outboard link slots 58A, 58B. Simultaneously, the inboard and outboard lower connectors 46A, 46B slide along the inboard and outboard bracket slots 34A, 34B toward the forward ends of the inboard and outboard bracket slots 34A, 34B. As the lift assembly 26 moves to the raised position, an angle α between the inboard outer link 38A and the body 122A of the inboard bracket 30A increases, and an angle β between the inboard inner link 50A and the body 122A simultaneously increases. Likewise, an angle α between the outboard outer link 38B and the body 122B of the outboard bracket 30B increases, and an angle β between the outboard inner link 50B and the body 122B simultaneously increases. In various examples, the degree of increase of the angles α and the degree of increase of the angles β may be the same. In other examples, the degrees of increase of the angles α and the angles β may be different. It is contemplated that rotation of the pinion 164 may be stopped when any point on the edge of the sector gear 62 between the upper and lower ends are proximate the pinion 164 to provide an intermediate position, as illustrated in FIG. 4B. In the intermediate position, the inboard and outboard upper connectors 22A, 22B are positioned between the forward ends and the rearward ends of the inboard and outboard link slots 58A, 58B, and the inboard and outboard lower connectors 46A, 46B are positioned between the forward ends and the rearward ends of the inboard and outboard bracket slots 34A, 34B.

When the lift assembly 26 reaches the raised position, a lower end of the sector gear 62 is positioned proximate the pinion 164 of the actuator 66. As illustrated in FIG. 4C, the inboard and outboard upper connectors 22A, 22B are positioned at the rearward ends of the inboard and outboard link slots 58A, 58B, while the inboard and outboard lower connectors 46A, 46B are positioned at the forward ends of the inboard and outboard bracket slots 34A, 34B. The pinion 164 may also be rotated by the actuator 66 in a second, opposite direction to rotate the sector gear 62 to move the lift assembly 26 from the raised position to the lowered position.

The lift assembly 26, as illustrated in FIGS. 1-5B, allows for the vertical translation of the seat pan 18 of the vehicle seat 10 while minimizing the fore and/or aft translation of the seat pan 18 and the seat base 12. The fore and/or aft translation is minimized by providing the inboard and outboard lower connectors 46A, 46B to slide along the inboard and outboard bracket slots 34A, 34B, and the inboard and outboard upper connectors 22A, 22B to slide along the inboard and outboard link slots 58A, 58B. This may further prevent tilting of the occupant 90 of the vehicle seat 10 as the seat pan 18 and seat base 12 are moved between the raised position and the lowered position by the lift assembly 26. It may also minimize a gap developed between a cushion of the seat base 12 and a cushion of the seatback 14. These adjustments may prevent the occupant 90 of the vehicle seat 10 from having to re-adjust their position within the vehicle seat 10 after adjusting the lift assembly 26.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seat, comprising:
   a seat base having a seat pan and operably coupled with a seatback;
   an upper connector positioned on the seat pan; and
   a lift assembly operably coupled with the seat pan, wherein the lift assembly includes:
   a bracket defining a bracket slot;
   an outer link having a first end rotatably coupled with the seat pan and a second end including a lower connector, the lower connector slidably received by the bracket slot;
   an inner link having a first end rotatably coupled with the bracket and a second end defining a link slot, wherein the link slot is configured to receive the upper connector; and
   a sector gear configured to facilitate vertical translation of the seat base.

2. The vehicle seat of claim 1, wherein the seatback is directly coupled with the bracket at a pivot.

3. The vehicle seat of claim 1, further comprising:
   an actuator operably coupled with the sector gear and configured to engage with the sector gear to rotate the inner link to facilitate the vertical translation of the seat base.

4. The vehicle seat of claim 1, wherein the seat pan defines a recess configured to at least partially receive the lift assembly.

5. The vehicle seat of claim 1, wherein a cross-member is fixedly coupled with the first end of the inner link.

6. A vehicle seat, comprising:
   a seat pan including an upper connector; and
   a lift assembly operably coupled with the seat pan, wherein the lift assembly includes:
   a bracket defining a bracket slot;
   an outer link rotatably coupled with the seat pan and slidably received by the bracket slot;
   an inner link rotatably coupled with the bracket, the inner link defining a link slot configured to receive the upper connector; and
   a sector gear coupled with the inner link and configured to facilitate vertical translation of the seat pan.

7. The vehicle seat of claim 6, further comprising:
   an actuator operably coupled with the sector gear, the actuator including a pinion having a plurality of pinion teeth, wherein the plurality of pinion teeth are gearingly engaged with a plurality of gear teeth of the sector gear.

8. The vehicle seat of claim 6, further comprising:
   a track assembly having first and second rail slides slidably coupled with first and second tracks; and
   a plurality of fasteners operably coupling the bracket with one of the first and second rail slides.

9. The vehicle seat of claim 6, further comprising:
   a track assembly having first and second rail slides slidably coupled with first and second tracks, wherein the bracket is integrally formed with one of the first and second rail slides.

10. The vehicle seat of claim 6, wherein the bracket slot and the link slot are generally obround.

11. The vehicle seat of claim 6, wherein the inner link is pivotally coupled with the outer link at a central pivot point.

12. A lift assembly for a vehicle seat, comprising:
    a seat pan including an upper connector;
    a bracket defining a bracket slot;
    an outer link rotatably coupled with the seat pan at a first end and slidably received by the bracket slot at a second end;
    an inner link including a first end rotatably coupled with the bracket and a second end defining a link slot configured to receive the upper connector; and
    a sector portion including a sector gear coupled with the inner link and configured to rotate to facilitate vertical translation of the seat pan.

13. The lift assembly of claim 12, wherein the seat pan includes an upper portion extending from a lower portion, the upper portion configured to form a plurality of sidewalls configured to support an occupant.

14. The lift assembly of claim 13, wherein the lower portion of the seat pan includes a front edge and a rear edge, the front edge and the rear edge configured to at least partially define a recess, and further wherein the recess is configured to at least partially receive the lift assembly.

15. The lift assembly of claim 12, further comprising:
    an actuator operably coupled with the sector gear and configured to rotate the sector gear to facilitate the vertical translation of the seat pan.

16. The lift assembly of claim 15, wherein the actuator includes a pinion having a plurality of pinion teeth, wherein the plurality of pinion teeth are gearingly engaged with a plurality of gear teeth of the sector gear.

17. The lift assembly of claim 12, further comprising:
    a low-friction rim insert positioned within one of the bracket slot and the link slot.

18. The lift assembly of claim 12, wherein the sector portion defines a guide slot, the guide slot configured to guide rotation of the sector gear.

19. The lift assembly of claim 12, further comprising:
    a track assembly having first and second rail slides slidably coupled with first and second tracks.

20. The lift assembly of claim 12, wherein the bracket is directly coupled with a seatback of said vehicle seat.

* * * * *